United States Patent
De Roose

(10) Patent No.: US 6,892,244 B2
(45) Date of Patent: May 10, 2005

(54) METHOD OF TRANSMITTING REAL-TIME DATA FROM A NETWORK ELEMENT TO AN APPLICATION SERVER

(75) Inventor: Kris De Roose, Maldegem (BE)

(73) Assignee: Siemens Aktiengesellschaft, Munich (DE)

( * ) Notice: Subject to any disclaimer, the term of this patent is extended or adjusted under 35 U.S.C. 154(b) by 765 days.

(21) Appl. No.: 09/960,783

(22) Filed: Sep. 21, 2001

(65) Prior Publication Data

US 2002/0049746 A1 Apr. 25, 2002

(30) Foreign Application Priority Data

Sep. 21, 2000 (EP) .............................. 00120666

(51) Int. Cl.[7] .............................................. G06F 15/16
(52) U.S. Cl. ........................ 709/234; 709/231; 709/223; 711/135; 711/162; 711/114; 707/200
(58) Field of Search .............................. 709/234, 231, 709/223; 711/134, 162, 114; 707/200

(56) References Cited

U.S. PATENT DOCUMENTS

| | | | |
|---|---|---|---|
| 5,402,428 A | * 3/1995 | Kakuta et al. ................. | 714/9 |
| 5,504,888 A | 4/1996 | Iwamoto et al. | |
| 5,819,083 A | 10/1998 | Chen et al. | |
| 5,991,746 A | 11/1999 | Wang | |
| 6,166,563 A | * 12/2000 | Volk et al. ...................... | 326/87 |
| 6,243,824 B1 | * 6/2001 | Kakuta et al. .................. | 714/3 |
| 6,526,447 B1 | * 2/2003 | Giammaria .................. | 709/232 |
| 6,546,382 B1 | * 4/2003 | Amor et al. .................... | 707/2 |
| 2002/0012424 A1 | * 1/2002 | Nishio et al. .......... | 379/100.06 |
| 2002/0026566 A1 | * 2/2002 | Awada et al. ............... | 711/162 |
| 2002/0103784 A1 | * 8/2002 | Lee et al. ...................... | 707/2 |
| 2002/0133670 A1 | * 9/2002 | Rust et al. ................... | 711/114 |

FOREIGN PATENT DOCUMENTS

| | | | |
|---|---|---|---|
| EP | 840453 A2 | * 5/1998 | ......... H03K/19/003 |
| EP | 901302 A2 | * 3/1999 | ........... H04Q/11/04 |
| EP | 955635 A1 | * 11/1999 | ........... G11B/20/12 |
| WO | WO 93/12606 | 6/1993 | |
| WO | WO 99/15992 | 4/1999 | |
| WO | WO 99/27556 | 6/1999 | |

\* cited by examiner

Primary Examiner—Hosain Alam
Assistant Examiner—Liang-che Wang
(74) Attorney, Agent, or Firm—Bell Boyd & Lloyd LLC

(57) ABSTRACT

Transmission of real-time data from a network element to an application server, wherein, for real-time data generated in a network element, which are to be transmitted over a transmission link, the data transmission is disabled and the buffers are being filled to a flushing threshold, the data present in the buffers are flushed to a permanent storage medium as backup data. When data transmission over the link is enabled, backup data are read out into the buffers when the amount of filled buffers is smaller than a first threshold value and as long as the amount of filled buffers lies below a second threshold value.

4 Claims, 2 Drawing Sheets

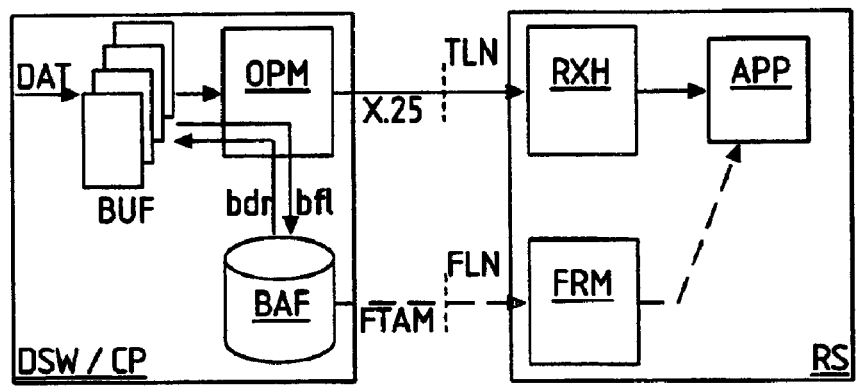
Fig. 1
Fig. 3
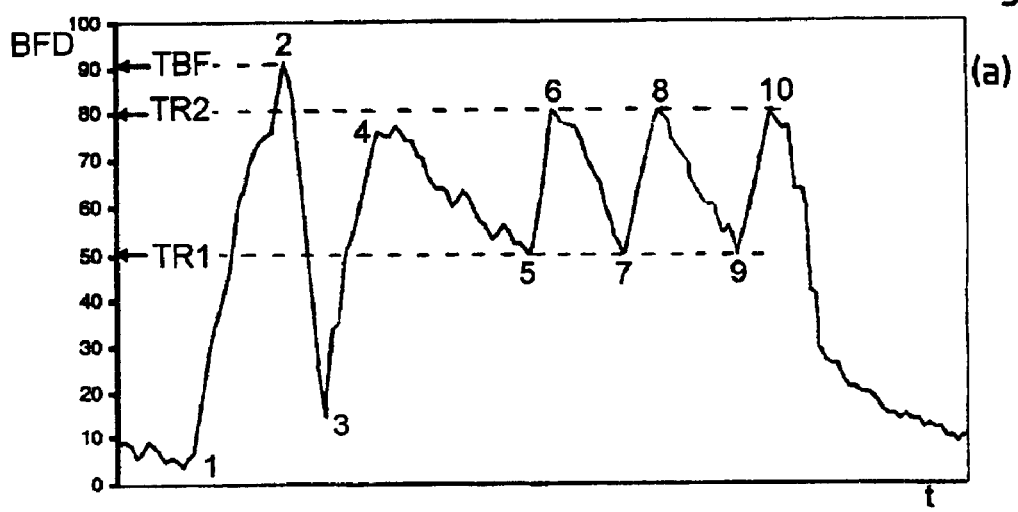
(a)
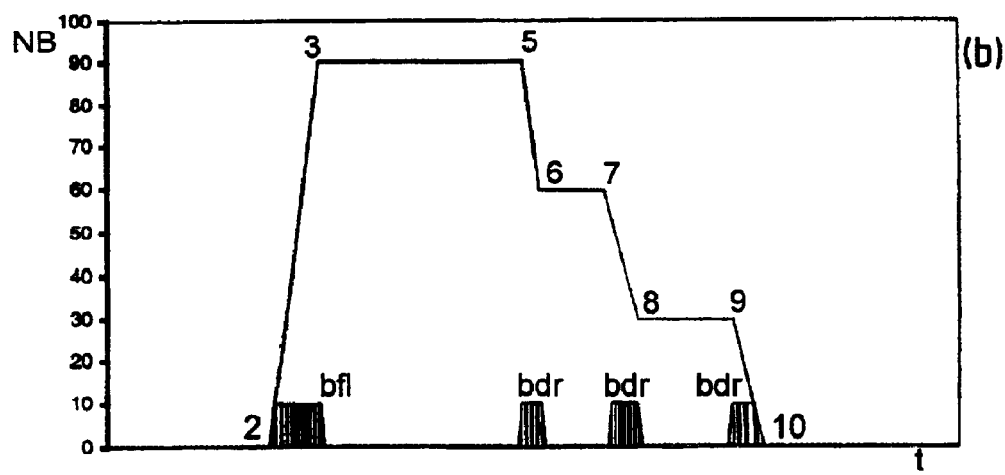
(b)

METHOD OF TRANSMITTING REAL-TIME DATA FROM A NETWORK ELEMENT TO AN APPLICATION SERVER

BACKGROUND OF THE INVENTION

The present invention relates to a method of transmitting real time data from a network element of a digital telecommunication network to a receiving server over a transmission link. The real time data are generated during operation of the network element and are collected in buffers located in transient memory of the network element and from the buffers the data are read out and transmitted over the transmission link. In the case that data transmission over the transmission link is disabled and the buffers are being filled, the data present in the buffers are flushed by being stored onto a permanent storage medium as backup data.

During operation of a network element, such as a switch or a cross connector, real-time data are generated which are intended for further processing by an external server. One example of such real-time data is the billing data which are generated by a switch of, e.g., a telephone network for each of the telephone connections processed. The billing data are then further processed by a billing application to calculate the individual charges billed to the users of the network. Formerly, the real-time data were gathered and stored on a medium by the network element and, in a separate step, the data were transferred via this medium to a processing station on which the processing application, such as the billing application, is run. Rather than this "offline" procedure, the present invention relates to the direct transfer of the real-time data to an external station.

The real-time data transfer allows fast spontaneous transfer of data over a link to an external receiving server for further processing, avoiding the need to store a substantial amount of data on the side of the network element. The receiving server need not actually be the processing station but can be an intermediate server which then transfers the data further to the processing station, without incurring any difference with regard to the present invention.

The real-time data to be transferred are generated continuously and are collected for the transfer to the application in buffers located in, for instance, transient memory. From there, the data are transmitted spontaneously; i.e., the data transmission is initiated by the sending station without specific request from the receiving side. The output of the data is done from the buffers via a transmission link employing, e.g., the well-known X.25 or IP protocols, often using a permanent connection. Thus, the transfer of data is performed directly between the network element and the application server and within a very short time, typically within a few seconds or minutes.

However, when used without a non-volatile backup system, this data transfer is not secure with respect to possible loss of data, which cannot directly be transmitted due to a fault, such as link failure or recovery of the receiving server, and stored for the duration of the fault. As the real-time data are generated as a consequence to the operation of the network element, the generation of new data to be transmitted is not stopped when a transmission failure occurs. When transmittal of data is not possible ("link outage"), further data are temporarily stored in transient memory buffers. When these buffers get full, newly generated data is lost until transmission becomes possible again.

One simple approach to increase security against data loss is to simply enlarge the number and/or size of the buffers; i.e., by increasing the total size of the transient memory reserved for temporary data storage. This method, which is independent of a backup system, increases the time before buffer overflow is reached in the case of link outage. However, the transient memory cannot be increased unlimited and, furthermore, this strategy enhances the risk that with a growing amount of data kept in transient memory, a large amount of data is eventually lost in case the sending server undergoes a failure recovery.

A known solution uses a backup system to increase the security of the real-time data transfer. When no output is possible over the link and all buffers in transient memory get full, all buffer contents are saved into a backup file on a permanent storage device, such as a hard disk. At a later time, the data are transferred to the receiving side by sending the backup file. Thus, transient memory space is made available again for the storage of further data that would otherwise be lost. However, there is no notification to the receiving side that some of the data are not sent, but rather saved into a backup file. The receiving server is required to poll if backup data need to be transferred. Furthermore, a separate link is necessary for the transfer of the backup file; e.g. via the FTAM service ("File transfer, Access and Management") as defined by OSI standards or the well-known FTP transfer ("File Transfer Protocol") based on the IP protocol. Moreover, the receiving server needs the software to receive the data and process the protocols with the backup data transfer, which represents a transmission mode well different from that of the real-time data transfer. Therefore, this solution enhances data security because it avoids the loss of data in case of a transmission fault such as a link failure, but it leads to a considerable overhead with respect to control and processing of the data to be received, as well as the hardware and software resources.

It is an aim of the present invention, therefore, to offer a backup system for real-time data transfer which avoids the above-mentioned disadvantages.

SUMMARY OF THE INVENTION

This aim is met by a method wherein, according to present invention, in the case that data transmission over the transmission link is enabled, backup data, if present on the permanent medium, are read out from the permanent medium into the buffers, wherein the procedure of reading out of the backup data is started when the amount of filled buffers is smaller than a first threshold value (hereinafter also referred to as "read-out threshold"), and is continued as long as backup data are present on the permanent medium and the amount of filled buffers lies below a second threshold value, the second threshold value (hereinafter also referred to as "read-out limit") being greater than the first threshold value.

In a preferred embodiment of the present invention, in order to further enhance the security of the backup procedure, the process of flushing the buffers to a permanent storage medium is started when data transmission is not possible over the transmission link and the amount of filled buffers is greater than a third threshold (hereinafter also referred to as "flushing threshold"). Preferably, this third threshold is greater than the second threshold.

In another embodiment of the present invention, the transmitted data are data relating to billing of telecommunication connection managed by the network element.

The present invention offers a secure backup system without the disadvantages of the above known solutions. When no output is possible due to, e.g., link outage, the transient buffers are further filled. At a certain filling degree, that is, when the flushing threshold is reached, all contents of the buffers filled so far are saved to permanent storage, for instance, into a backup file on disk. During the process of saving the data on disk, further data is stored in the remaining buffers. The value of this threshold is suitably chosen such that no buffer overflow can occur before the buffers are flushed and released for new data storage. The backup onto disk or other permanent memory is repeated each time that the flushing threshold is reached, and this will be the case as long as no output over the link is possible.

A central aspect of the present invention is the further treatment of the backed-up data. As soon as the link transmission is enabled again, if data is available in the backup file, the other two threshold values according to the present invention become active. Since the buffers will, in normal operation, be emptied by data transmission faster than they are filled due to generation of fresh real-time data, the buffer filling degree will decrease. When the buffer filling degree eventually falls below the read-out threshold, the oldest data in the backup file are dumped into the buffers for direct output again. This is done until the buffer filling degree reaches the second threshold, the read-out limit. The read-out of backup data is then stopped until the filling degree reaches the first threshold again, and the procedure is repeated as long as further backup data are available in the backup file.

Thus, by virtue of the present invention, the receiving server is not required to run additional tasks for the backed-up data, as it obtains all data over one and the same link and can process the data coming from a backup file in the same way as the data freshly generated and transmitted. The only difference between the two types of data is that the backup data, of course, are sent with some delay, though they are sent as soon as possible, the delay depending on the free capacity of the link. It is a further advantage of the present invention that no additional link is needed between the network element and the application server for transmission of the backup data. Rather, once the link transmission is recovered from link outage, the remaining link capacity is used which is not occupied for the "normal" data transmission; i.e., the direct transmission of freshly generated data. Since only the remaining capacity is used, the transmission of backup data does not impair the real-time data transmission. Thus, the present invention provides the optimal use of the existing link equipment and its capacity and, consequently, it dispenses with the need of an extra link as well as the communication overhead and data processing associated therewith.

The present invention is illustrated herein with the help of a preferred embodiment relating to "hot billing" of a known EWSD switch system of the applicant.

Additional features and advantages of the present invention are described in, and will be apparent from, the following Detailed Description of the Invention and the Figures.

BRIEF DESCRIPTION OF THE FIGURES

FIG. 1 illustrates a box-chart of the components and the real-time data exchange between these components according to the teachings of the present invention.

FIG. 3 shows the buffer filling degree (FIG. 3a) and the number of backed-up buffers (FIG. 3b) as functions of the time in an example.

DETAILED DESCRIPTION OF THE INVENTION

Figure 2:
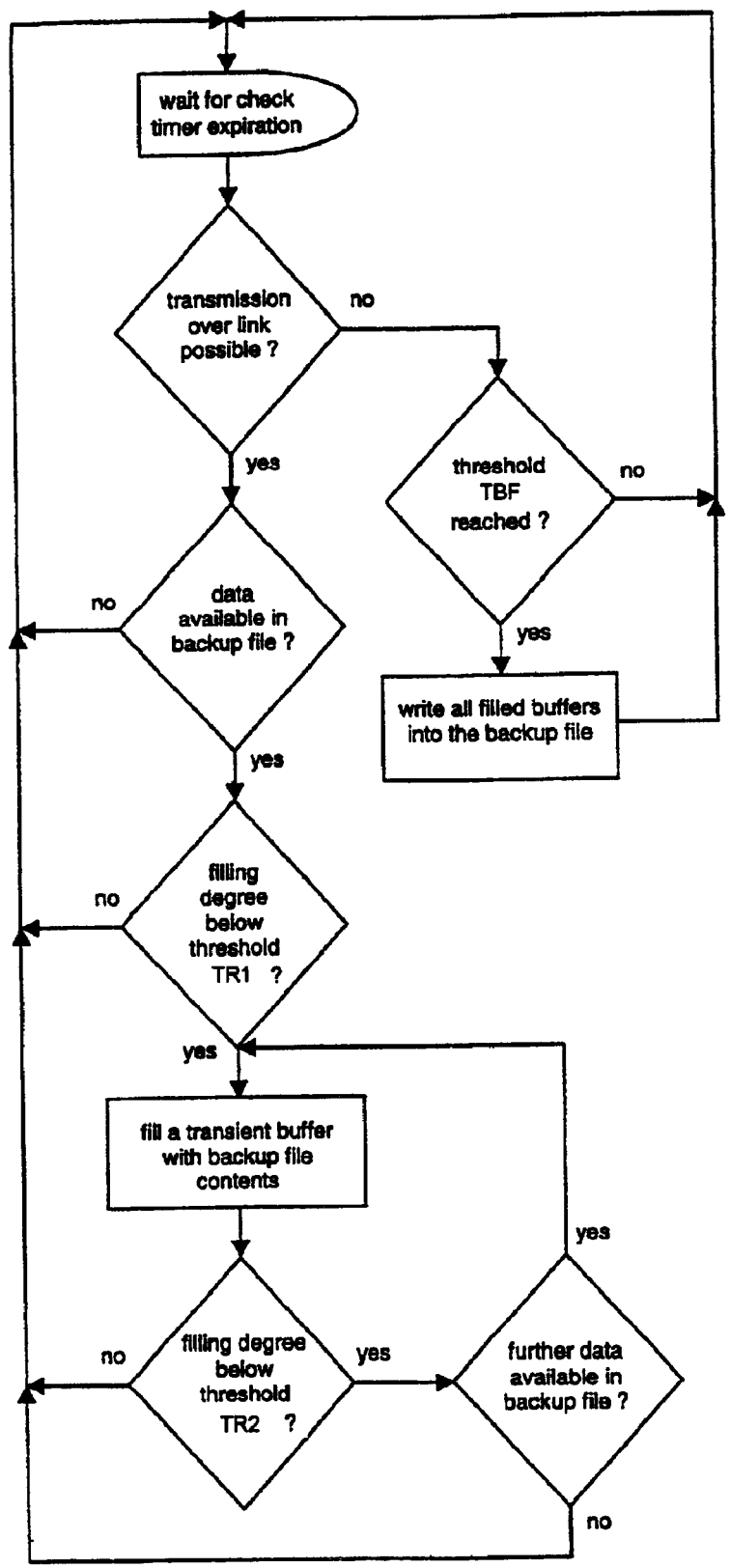
FIG. 2 shows a flow chart of the backup system.

The hot billing procedure according to the present invention discussed in the following relates to the spontaneous sending of call detail records from a digital switch to a location outside the switch, immediately or very shortly after the records have been generated, allowing direct output of call detail records over an X.25 link.

With reference to FIG. 1, call detail data DAT are generated and processed for hot billing by the Coordination Processor CP of the digital switch system DSW; for instance, a known EWSD switch of the applicant. The records are continuously generated on a per-call-basis. The generated records are stored into buffers BUF in transient memory and buffers thus filled are transferred by an output management OPM to a receiving manager RXH of an external server RS over a previously established, permanent transmission link TLN which is, e.g., an X.25 link. The external server RS then further processes the received call detailed records, for instance in a hot billing application APP. The hot billing application APP is, as its name says, in first instance designed for subscriber billing. It is, however, also suitable for other applications, such as inter-administrative revenue accounting, display of charge information, prepaid service, fraud detection and network management.

FIG. 2 shows an example of a flow chart of the backup system performed by the output management OPM for the flushing bfl or reading out bdr of the backup data.

FIG. 3a shows an example of the time-dependent development of the buffer filling degree BFD and FIG. 3b the number of buffers NB held in the backup file BAF. The time scale of FIGS. 3a and 3b is identical. Both quantities BFD, NB are stated in percent with respect to the total number of buffers BUF.

In consequence to link outage of the transmission link TLN or receiving server breakdown, in FIG. 3 referred to by the numeral 1, no transmission over the link is possible. The generation of new records DAT, however, is not stopped and the transient buffers BUF are further filled. When a certain filling degree, i.e. the flushing threshold TBF, is reached (indicated by the numeral 2) all filled buffers are saved into a backup file BAF on the disk associated with the Coordination Processor CP. When the link is not immediately recovered, the same procedure is repeated; that is, each time the flushing threshold for dump to backup file is reached the filled buffers are written into the file. Due to the buffer flushing bfl all buffers filled with data at the time are written to the backup file and then released. When the buffer flushing is completed (numeral 3), the filling degree BFD is reduced to a small value which may be greater than zero due to new data generated during the buffer flushing process. The flushing threshold TBF is chosen such that during the saving into the backup file no overflow of the buffers will occur. Thus, even in case of high traffic load, the emptying and release of filled buffers can be executed before the remaining buffers get full.

When transmission over the link becomes possible again (numeral 4), transmission of the data in the buffers resumes. The processing of the backup data depends on the filling degree of the buffers and the amount of newly generated records. As soon as the buffer filling degree BFD gets below the thresholds TR1,TR2 associated with the read-out of backed-up data, the method according to the present invention allows control of the transmission of backup data so as to transmit the data as soon as possible without endangering the normal transmission of newly generated data. When the read-out threshold TR1 is reached (numeral 5), data from the backup file BAF are read out into the buffers BUF until the filling degree reaches the threshold limit TR2 (numeral 6).

The read-out process bdr is repeated (numerals 7,8, 9,10) until all backup data are written back to the buffers.

The read-out threshold TR1 corresponds to the maximum traffic load at which the start of transmission of backup data is allowed. If the traffic load decreases, the buffer filling decreases, too, and as soon as this threshold TR1 is reached, transmission of backup data becomes possible. The higher the read-out threshold TR1 is chosen, the sooner transmission of backup data will start, but the less data can be transmitted at once because the maximum buffer filling degree for transmission of backup data, i.e. the read-out limit TR2, will be reached earlier. Like with the flushing threshold TBF, the read-out limit TR2 is chosen in a manner such that, taking the expectable traffic load into account, no overflow of the buffers will occur due to the transmission of the backed-up data additionally to the "normal" transfer of real-time data.

In particular, the method according to the present invention has the following advantages:

- the data transmission is secure against breakdown of the transmission link and receiving server;
- no extra link is necessary to transfer the backup data that were saved while transmission was disabled;
- no message is necessary to notify the receiving server after recovery that backup data are available;
- no additional software is needed for the receiving server to get and process the backup data, because the data are transparently transferred as normal data over the transmission link;
- better use of the capacity of the existing link as backup data are transferred when capacity is free; and
- the backup data are available at the receiving side as soon as possible without further measures, the necessary time depending on the link load and on the amount of backup data collected.

In comparison to the present invention, the known solution using a backup file transfer (for instance, via the FTAM service) leads to many disadvantages. First of all, the receiving server RS must be informed that backup data are available at the sending server, which makes an extra notification message necessary. The notification may even be sent over the existing transmission link TLN, but for this, the communication protocol must be adapted and additional software is needed at both sides, sending and receiving server. Furthermore, the known solution requires an extra link FLN for file transfer. This link requires additional hardware and software FRM, e.g. an FTAM application, on the side of the receiving server RS because the communication protocol for file transfer is different from that of the real-time data transfer and, thus, also the data processing must be adapted.

The inventive solution is, on the contrary, simple and flexible. The real-time data transfer is enhanced with security against transmission breakdown without any change in the used communication protocol and without additional transmission link. Only the sending server CP needs to be adapted for the method according to the present invention. The simplicity together with the flexibility provided by the adjustable thresholds TBF,TRI,TR2 makes the present invention attractive for other applications as well. Most applications with real-time output can use the concept of the present invention, in particular in cases where the output data is not allowed to be lost and where a certain data sequence of transmittal is not mandatory. The behavior of the backup data processing can be controlled by adjusting the threshold values to the application specifics.

Although the present invention has been described with reference to specific embodiments, those of skill in the art will recognize that changes may be made thereto without departing from the spirit and scope of the invention as set forth in the hereafter appended claims.

What is claimed is:

1. A method of transmitting real-time data from a network element of a digital telecommunication network to a receiving server over a transmission link, the method comprising the steps of:

collecting the real-time data generated during operation of the network element in buffers located in transient memory of the network element;

reading out the data from the buffers;

transmitting the data which has been read out from the buffers over the transmission link;

flushing the data present in the buffers, if data transmission over the transmission link is disabled and the buffers are being filled, by storing the data onto a permanent storage medium as backup data; and reading out the backup data, if the backup data is present on the permanent storage medium, from the permanent medium into the buffers if data transmission over the transmission link is enabled, starting when an amount of the filled buffers is smaller than a first threshold value, and continuing as long as backup data are present on the permanent storage medium and the amount of the filled buffers lies below a second threshold value, the second threshold value being greater than the first threshold value.

2. A method of transmitting real-time data from a network element of a digital telecommunication network to a receiving server over a transmission link as claimed in claim 1, wherein the step of flushing is started when data transmission is not possible over the transmission link and the amount of the filled buffers is greater than a third threshold value.

3. A method of transmitting real-time data from a network element of a digital telecommunication network to a receiving server over a transmission link as claimed in claim 2, wherein the third threshold value is greater than the second threshold.

4. A method of transmitting real-time data from a network element of a digital telecommunication network to a receiving server over a transmission link as claimed in claim 1, wherein the real-time data are related to billing of a telecommunication connection managed by the network element.

* * * * *